United States Patent [19]

Feldman

[11] Patent Number: 4,538,141

[45] Date of Patent: Aug. 27, 1985

[54] WATER DETECTION SUBASSEMBLY AND METHOD OF FORMING SAME, FOR COMPUTER PROCESSING CENTERS

[75] Inventor: Richard B. Feldman, Redwood City, Calif.

[73] Assignee: Chevron Research Company, San Francisco, Calif.

[21] Appl. No.: 432,846

[22] Filed: Oct. 4, 1982

[51] Int. Cl.³ ............................................. G08B 21/00
[52] U.S. Cl. ................................. 340/604; 200/61.05; 340/620; 405/37; 405/46; 174/136
[58] Field of Search ................. 340/604, 620; 174/136, 174/70 C, 72 C; 73/40, 40.5 R, 49.1; 200/61.04, 61.05; 104/275, 277; 52/12; 405/157, 43, 45, 37, 46; 138/104, 105, 125, 159, 160, DIG. 7

[56] References Cited

U.S. PATENT DOCUMENTS

| | | | |
|---|---|---|---|
| 2,162,926 | 6/1939 | Wuelker | 405/46 |
| 3,440,823 | 4/1969 | Olsen | 405/43 |
| 3,824,460 | 7/1974 | Gustafson | 340/604 X |
| 3,882,476 | 5/1975 | Löfgren | 340/602 X |

OTHER PUBLICATIONS

Washington Post publication; Do It Yourself, "New Type Gutter Guard Ends Clogging for Years", by J. R. Dalzelli, Jul. 22, 1961, p. B3.

*Primary Examiner*—James L. Rowland
*Assistant Examiner*—Daniel Myer
*Attorney, Agent, or Firm*—H. D. Messner; Edward J. Keeling

[57] ABSTRACT

The present invention relates to a water detection subassembly and method for forming same, for use in association with water detection system operating within a digital computing center. The subassembly includes a perforated protective shield fitted about a fabric mesh supporting copper conductors connected to a low voltage service. In that way, the shield completely isolates the fabric mesh and copper conductors against abuse such as provided from workmen's shoes coming into contact with the subassembly during repair, replacement or renovation of computing equipment at the center.

The shields are conveniently formed from commercially available plastic pipe such as PVC, sliced longitudinally and then attached to the concrete sub-floor of the computing room along the two cut longitudinal surfaces. Since a pair of shields can be formed from each section of plastic pipe, the shields are inexpensive to manufacture. Installation (and replacement) is facilitated by using a concrete stud gun to insert head-less studs into the concrete sub-floor through each shield following by capping the subassembly with wing nuts. A series of semi-circular openings along the shield give the shield a scalloped look and permits water an easy route into the interior of the subassembly.

4 Claims, 4 Drawing Figures

U.S. Patent  Aug. 27, 1985  Sheet 1 of 3  4,538,141
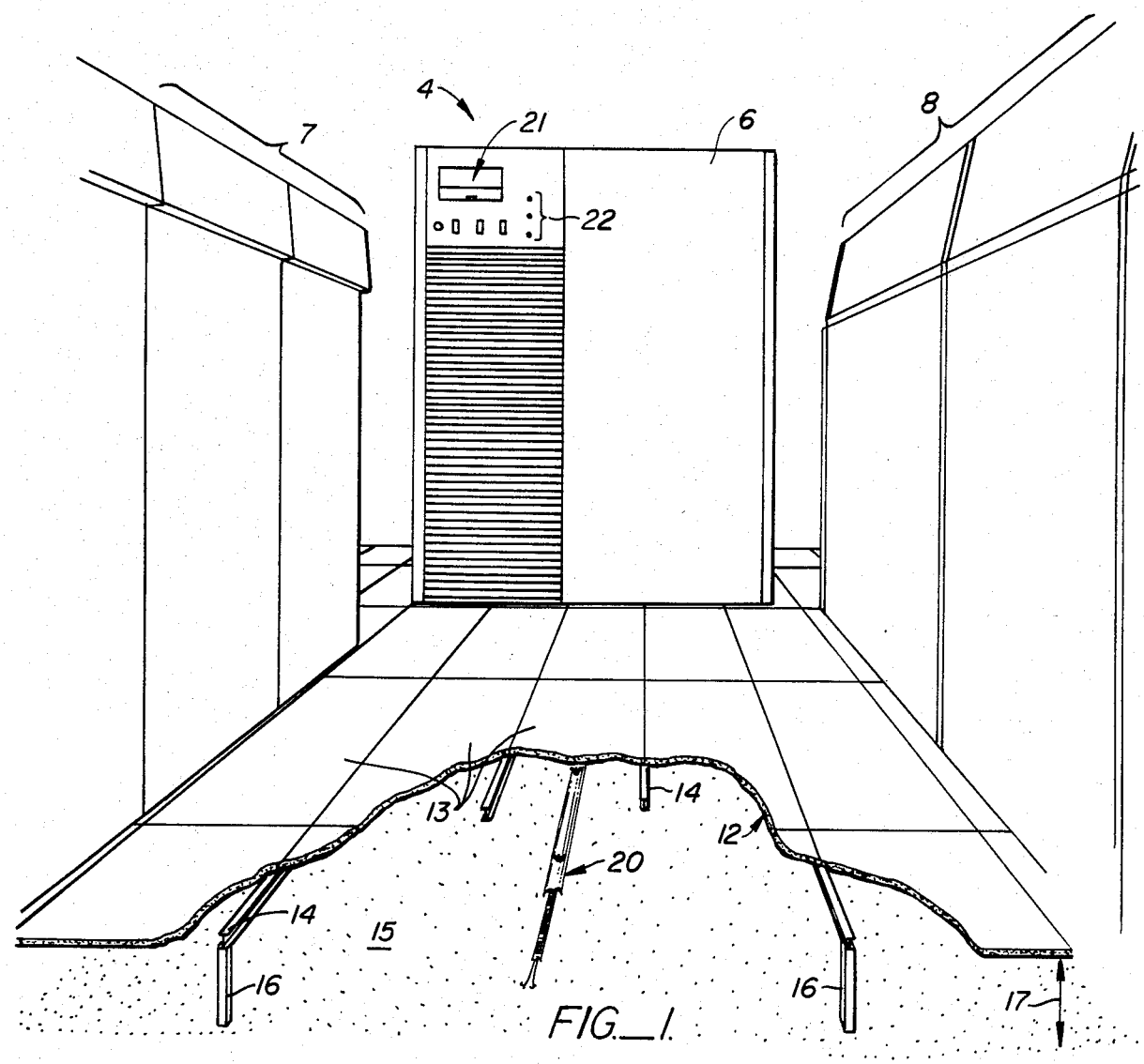
FIG._1.
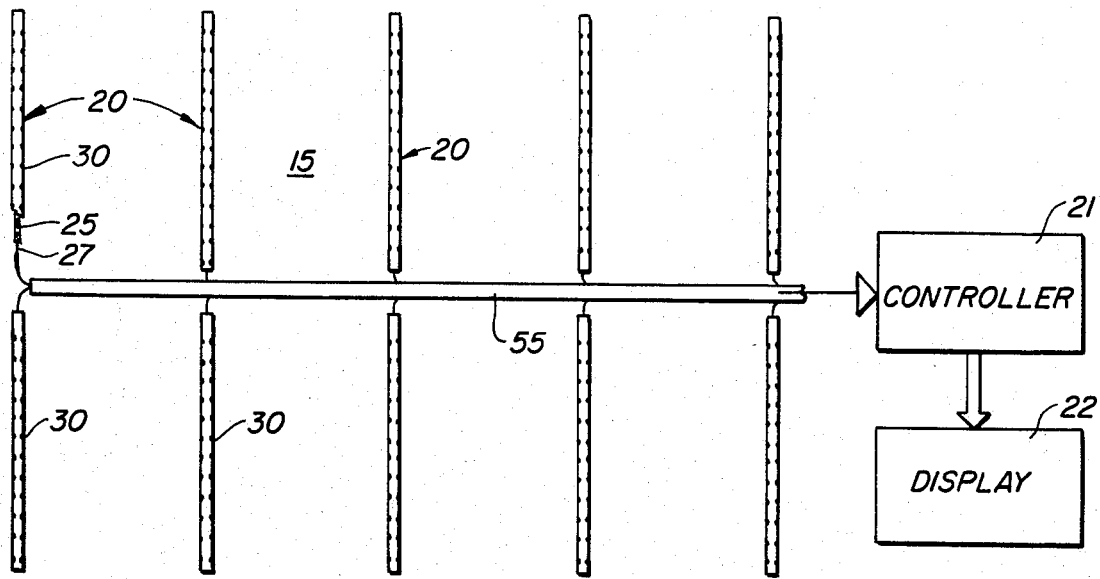
FIG._4.

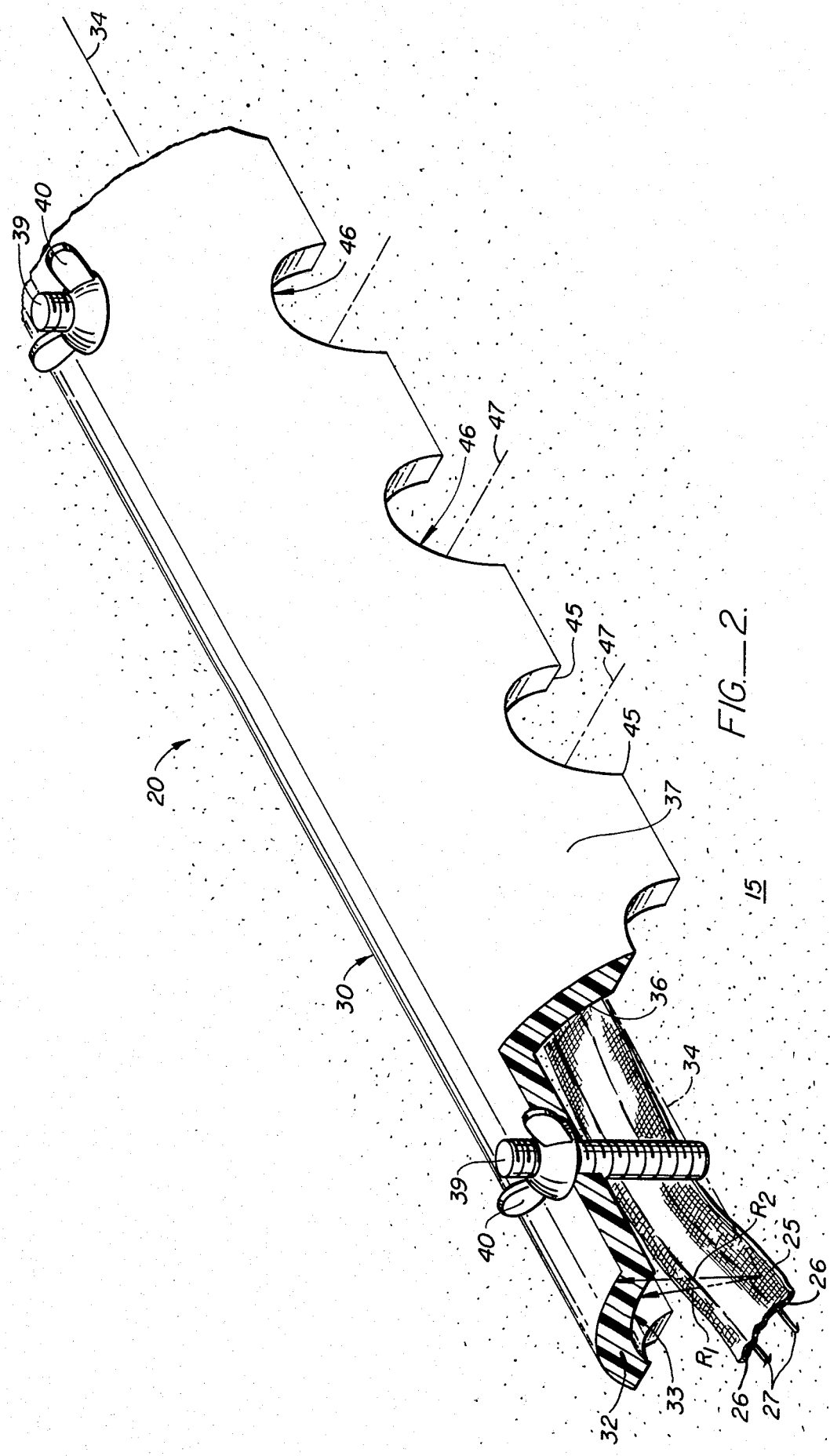

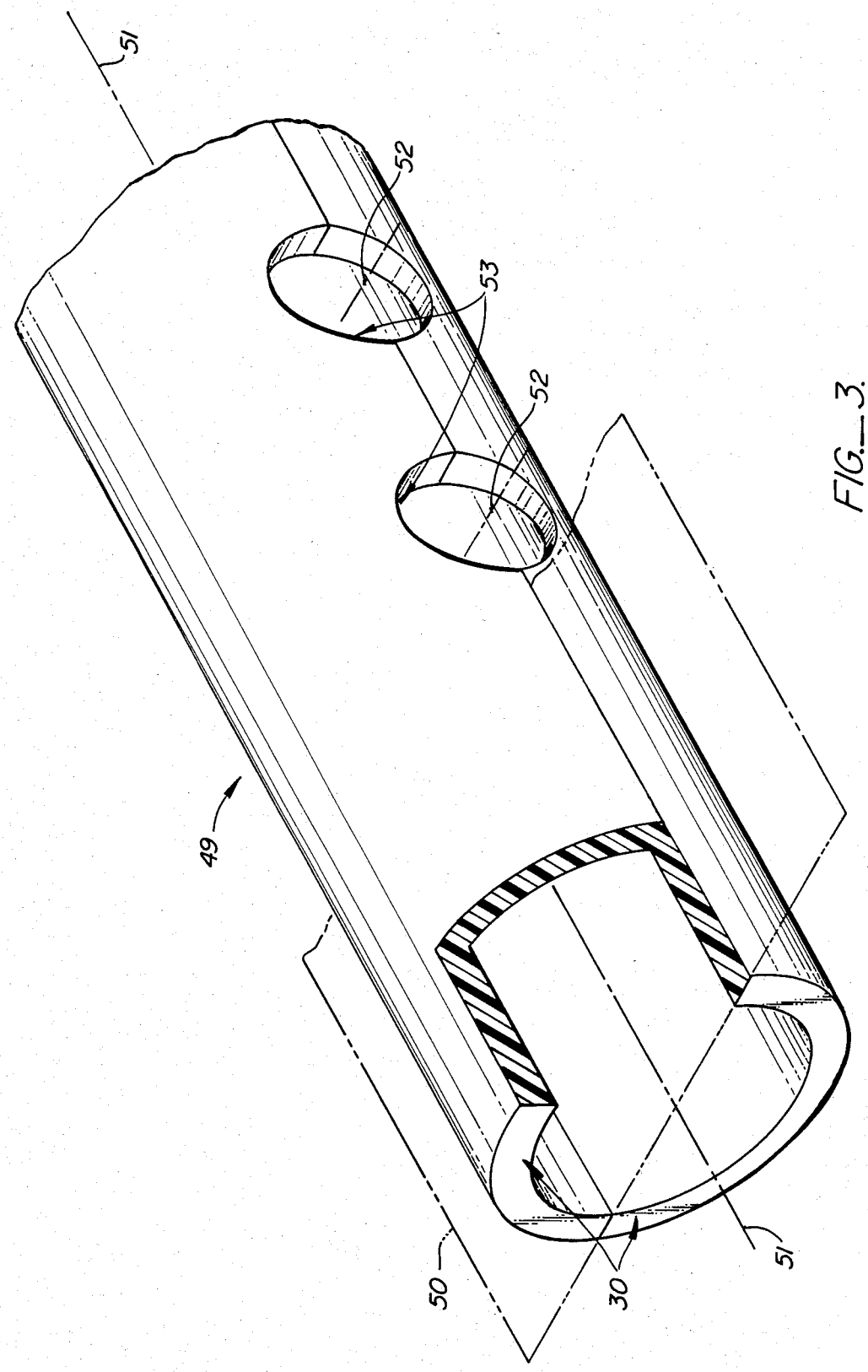
FIG._3.

WATER DETECTION SUBASSEMBLY AND METHOD OF FORMING SAME, FOR COMPUTER PROCESSING CENTERS

SCOPE OF THE INVENTION

This invention relates to water detection systems used in connection with digital computer processing centers and more particularly to a subassembly and method of forming same, for extending the life of such systems even though the associated computing equipment is subject to frequent renovation, repair and replacement.

BACKGROUND OF THE INVENTION

In designing today's modern computing centers for digital computer and their associated equipment, i.e., I/O's, printers, modems, etc., architects provide a rather standard approach to construction: a sub-floor say of concrete is first poured and then a raised support floor is built above the sub-floor. The latter usually consists of a series of horizontal panels removably resting on a web of rails supported, in turn, by a set of headers. A vertical workspace is provided between the panels and the sub-floor in order to stow electrical wiring harnesses and the like, to permit easy internal connection of the computer and associated peripheral equipment as well as external connection of the latter to outside tieing equipment.

Since such centers represent a large capitol investment, a detection system is typically provided to warn operators if water enters the sub-floor beneath the computing equipment. The system usually includes a detector subassembly consisting of a fabric mesh of electrically inert material supporting a pair of electrical conductors.

The subassembly is placed atop the concrete sub-floor in a predetermined deployment pattern. Electrically, the conductors connect to a display panel through a controller.

If water comes into contact with the fabric mesh, an electrical circuit that includes the conductors, the water bridge and an energy source (at the controller), is closed. At the display panel, a visual and/or audio alarm in the same circuit become energized, alerting the operator to the presence of water (at the floor level below the computing equipment).

But experience has now shown that during frequent renovation, repair or replacement of the computer and/or associated equipment, workman laboring in the work space, can abuse the fabric mesh atop the sub-floor, resulting in unreliable operations of the water detection system.

That is to say, the activity of the workmen, e.g., can roughen the fabric mesh allowing the latter to loosen its fit about the conductors. Since the relative distance between conductors is thus altered (sometimes drastically!), the amount of water that activates the system is likewise changed but in a non-linear manner. The resulting unreliability inherent in such circumstances, can be very disruptive to normal operations, especially in the environment of a busy computing center in which various computing and associated activities are occurring simultaneously.

SUMMARY OF THE INVENTION

In accordance with the present invention, a perforated plastic shield formed from conventional plastic pipe is fitted about the fabric mesh and copper conductors to completely isolate the latter against abuse. The shields are conveniently formed by longitudinally cutting a section of the commercially available pipe along a plane intersecting its axis of symmetry. Attachment of the resulting shields to the sub-floor is along the broad cut longitudinal surfaces of the side wall.

Since a pair of shields is formed from each section of pipe, the shields are inexpensive to manufacture. Installation (and replacement) is facilitated by using a concrete stud gun to insert headless studs into the concrete thru the shields followed by capping the subassembly with wing nuts.

A series of semi-circular openings along the shield (intersecting the longitudinally cut side wall) gives the shield a scalloped look, and permits water an easy route into the interior of the shield for detection. Since the axes of the openings intersect the plane of the cut side wall, their construction can be combined with the formation of the latter. That is, a series of evenly spaced holes can be pre-drilled transverse of the axis of symmetry of the plastic pipe before longitudinally cutting of the pipe occurs.

BRIEF DESCRIPTION OF THE DRAWINGS

FIG. 1 is a perspective view of a modern computer center in which a raised floor is partially cutaway so as to better illustrate a water detection subassembly including protective shields enclosing a fabric mesh-copper conductor combination, positioned atop a concrete sub-floor;

FIG. 2 is a perspective view of the protective shield of FIG. 1;

FIG. 3 is another perspective view of a section of plastic pipe constructing shields of FIGS. 1 and 2; and FIG. 4 is a pictorial representation of a particular detection arrangement of the detection subassembly of FIG. 1 in accordance with the present invention as well as shows electrical connection of the conductors of that subassembly to a display panel through a controller.

DETAILED DESCRIPTION OF THE INVENTION

A modern computing center 4 is shown in FIG. 1. The center 4 includes usual computing equipment, say a computer main-frame 6, and peripherals such as I/O's, modems, etc. The computing equipment is positioned in a computing room that includes side walls 7, 8, and a raised floor 12 formed of a series of horizontally disposed panels 13. The panels 13 removably rest on a web of support rails 14. The rails 14 in turn are supported above a concrete sub-floor 15 by a series of headers 16. Between the raised floor 12 and the sub-floor 15 is a work space 17. The space 17 provides a storage area for electrical wiring harnesses (not shown) associated with computing equipment.

At the intersection of work space 17 and sub-floor 15 is water detection subassembly 20 of the present invention. While mechanically, the subassembly 20 is positioned atop sub-floor 15, electrically subassembly 20 connects topside to controller 21 and display panel 22. Operation of the controller 21 and display 22 in conjunction with detection of water on a sub-floor, will be described in detail below.

FIG. 2 illustrates water detection subassembly 20 in more detail.

Water detection subassembly 20 includes a fabric mesh 25 of roughly rectangular cross section. The mesh 25 is electrically non-conductive and is preferably formed of an open weaved, liquid permeable construction such as provided by impregnating loose strands of nylon with glass fibers. The nylon/glass fiber combination is then formed so as to include side-by-side channels 26. These channels 26 snugly support a pair of copper conductors 27.

The mesh 25 and copper conductors 27 are not subject to abuse from above, however, because surrounding that combination is a series of protective shields 30. Their purpose: to keep the mesh 25 from tearing and hence preventing loosening of the mesh support from the copper conductors 27.

That is to say, the present invention provides a curved protective dome 33 strong enough to keep outside forces (viz., those generated by workmen's shoes) from being applied directly to the mesh 24 and/or conductors 27. The dome 33 is semicircular in cross section and is seen in FIG. 2 to have inner and outer surfaces 36 and 37, respectively, defined by radii R1 and R2. Both radii originate from central axis of formation 34 of the dome 33.

Note that the central axis of formation 34 also intersects a series of studs 39. One end of each stud 39 is imbedded in the concrete sub-floor 15 (via application of compressional forces say by using a stud-gun to shoot each stud through the apex of the dome 33). The other end is threaded with a wing nut 40. In that way, pressure can be applied via the nut 40 to the outer surface 37 of the done 33 thereby securing the shield 30 relative to the sub-floor 15.

At the intersection of the sub-floor and the side wall 34, i.e., at the intersection of first and second surfaces 45 and the sub-floor 15, note the presence of twin series of semi-circular openings 46. Each opening has a central axis of formation 47 transverse to central axis 34. Thus, from the side, the ports provide a scalloped look to the shield 30. The purpose of openings 46: to permit water an easy route into the interior of the shield for detection.

FIG. 3 illustrates constructional details of the shield 30 of FIG. 2.

As indicated, a pair of shields 30 can be conveniently formed from a section of plastic pipe 49, such as commercially available 2½ inch O.D. PVC pipe sliced longitudinally along a horizontal cutting plane 50. Note plane 50 intersects both (i) axis of symmetry 51 of pipe 50 as well as (ii) axes of symmetry 52 of a series of evenly spaced openings 53. Note further that these axes of symmetry 51, 52 are not colinear but instead are orthogonal to each other. In that way, as the pipe 49 is horizontally cut along the cutting plane 50, the pre-drilled openings 53 are likewise bisected, viz., cut into equal diametrical segments, to provide the scalloped look previously mentioned.

Since pre-drilling of the openings 52 precedes the horizontal cutting step described above, production of the shields 30 is simplified and costs reduced. That is to say, since a pair of shields is formed from each section of pipe 49, the resulting shields 30 are relatively inexpensive to manufacture. Thereafter, each pair of shields undergo separate processing, being cut, for example, to specified lengths depending on the particular detection pattern chosen for the water detection subassembly of the present invention.

FIG. 4 illustrates a particular detection pattern for positioning subassemblies 20 atop the sub-floor 15, viz., as two-dimensional geographical linear arrays.

As shown a series of subassemblies 20 form a series of N×O linear arrays wherein each adjacently spaced pair of arrays share a central wiring harness 55. As previously mentioned, each subassembly 20 includes fabric mesh 25 woven so as to support copper conductors 27. Protecting the mesh 25 and conductors 27 is via the plurality of shields 30 previously described with specific reference to FIGS. 2 and 3, supra.

In operation, a small voltage is impressed across the conductors 27 by means of a power source within controller 21 (not shown). If water comes into contact with the fabric mesh 25 (and conductors 27), an electric circuit that includes the water bridge and the energy source, is closed. At the display panel 22 visual and/or audio alarms in the same circuit, become energized alerting the operator to the presence and geographical location of the water (at the sub-floor 15 below the computing equipment). I.e., activation of the indicator(s) at the display panel 22 can be coordinated with subassembly position atop the sub-floor 15 on a one-to-one basis, so as to further aid the operator to pinpoint the exact location of the water invasion.

While various controller and display circuits are available for providing the alarm and display functions indicative of water invasion, one particular system familiar to those skilled in the art is set forth in U.S. Pat. No. 3,882,476 for "Alarm System Periodic Test Section" in which a terminal resistor is used to impress a voltage across a segment of conductor/mesh electrically connected to a trigger circuit.

When water invades the mesh 25, the transition resistance of the combination is considerable reduced and the trigger circuit is activated to enable an alarm circuit for operator intervention.

The invention is not limited to the above combinations alone, but is applicable to other anomalous circumstances as known to those skilled in the art. It should thus be understood that the invention is not limited to any specific embodiments set forth herein, as variations are readily apparent.

For example, instead of using a linear array detection pattern for positioning the subassemblies 20 of the present invention atop the sub-floor 15, other patterns are also contemplated. A detection pattern which co-exists with the borders of the sub-floor 15, can be beneficial for example, as can patterns described as a "sunburst" pattern. Thus, the invention is to be given the broadest possible interpretation within the terms of the following claims.

What is claimed is:

1. Method of forming a series of water detection subassemblies in association with a water detection system for use in a digital computing center, said center including a computing room have a raised floor above a sub-floor supporting computing equipment and the like comprising:

(i) pre-drilling a section of conventional plastic pipe with a series of transverse openings, said openings have axes of symmetry coextensive with each other and intersecting the central axis of symmetry of the pipe at about 90 degrees;

(ii) slicing the plastic pipe longitudinally along a central plane to bisect both the pipe and said series of openings transverse to the central axis of symmetry, whereby at least a pair of shields per longitudinal cut of the pipe is formed;

(iii) attaching said shields to said sub-floor in a predetermined deployment pattern;

(iv) stringing lengthwise through each of said shields a fabric mesh formed of an electrically non-conducting material to physically support a pair of conductors;

(v) disconnectably connecting said conductors to a voltage source means in circuit with an alarm of said detection system whereby said alarm is normally inactive, but if water contacts said conductors adjacent said sub-floor the alarm is activated to warn operators of said water invasion, but wherein said mesh and conductors are completely protected against physical abuse as from contact with workmen's shoes and the like during repair, replacement or renovation of said computing equipment.

2. Method of forming a water detection subassembly in association with a water detection system for use in a digital computing center, said center including a computing room have a raised floor above a sub-floor supporting computing equipment and the like comprising:

(i) forming a perforated plastic shield of semi-circular cross-section;

(ii) attaching said shield to said sub-floor lengthwise about a fabric mesh formed of an electrically non-conducting material also supported by the sub-floor, the mesh being fashioned so as to physically support a pair of electrical conductors;

(iii) disconnectably connecting said conductors to a voltage source in circuit with an alarm of said detection system whereby said alarm is normally inactive, but if water contacts said conductors adjacent said sub-floor, the alarm is activated to warn human operators of said water invasion, but wherein said mesh and conductors are completely protected against physical abuse as from contact with workmen's shoes and the like during repair, replacement or renovation of said computing equipment.

3. Method of claim 2 in which step (ii) includes shooting a series of headless studs through said shield into said sub-floor but allowing a segment of each stud to extend above the shield and attaching nuts to said studs to secure the shield to the sub-floor.

4. Method of forming a water detection subassembly in association with a water detection system for use in a digital computing center, said center including a computing room have a raised floor above a sub-floor supporting computing equipment and the like comprising:

(i) pre-drilling a section of conventional plastic pipe with a series of transverse openings, said openings have axes of symmetry coextensive with each other and intersecting the central axis of symmetry of the pipe at about 90 degrees;

(ii) slicing the plastic pipe longitudinally along a central plane to bisect both the pipe and said series of openings transverse to the central axis of symmetry, whereby at least a pair of shields per longitudinal cut of the pipe, is formed;

(iii) arranging a fabric mesh in a predetermined pattern on the sub-floor, the mesh being formed of an electrically non-conducting material fashioned so as to physically support a pair of electrical conductors;

(iv) attaching at least one of the shields of step (ii) to the sub-floor lengthwise about the mesh and conductors;

(v) disconnectably connecting said conductors to a voltage source in circuit with an alarm of said detection system whereby said alarm is normally inactive, but if water contacts said conductors adjacent said sub-floor, the alarm is activated to warn human operators of said water invasion, but wherein said mesh and conductors are completely protected against physical abuse as from contact with workmen's shoes and the like during repair, replacement or renovation of said computing equipment.

* * * * *